(12) United States Patent
Moren

(10) Patent No.: US 6,762,256 B2
(45) Date of Patent: Jul. 13, 2004

(54) INITIATOR/AMIDINE COMPLEXES, SYSTEMS COMPRISING THE COMPLEXES, AND POLYMERIZED COMPOSITIONS MADE THEREWITH

(75) Inventor: Dean M. Moren, North St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 91 days.

(21) Appl. No.: 10/138,757

(22) Filed: May 3, 2002

(65) Prior Publication Data

US 2002/0182425 A1 Dec. 5, 2002

Related U.S. Application Data

(62) Division of application No. 09/433,236, filed on Nov. 4, 1999, now Pat. No. 6,410,667.

(51) Int. Cl.$^7$ ................................................. C08F 4/44
(52) U.S. Cl. .................... 526/134; 526/183; 526/195; 526/196; 526/217; 502/202
(58) Field of Search ................................. 526/196, 134, 526/217, 195, 183; 502/202

(56) References Cited

U.S. PATENT DOCUMENTS

| | | |
|---|---|---|
| 4,006,124 A | 2/1977 | Welte et al. |
| 4,538,920 A | 9/1985 | Drake |
| 5,082,147 A | 1/1992 | Jacobs |
| 5,106,928 A * | 4/1992 | Skoultchi et al. ............ 526/196 |
| 5,286,821 A | 2/1994 | Skoultchi |
| 5,310,835 A | 5/1994 | Skoultchi et al. |
| 5,512,613 A | 4/1996 | Afzali-Ardakani et al. |
| 5,539,070 A | 7/1996 | Zharov et al. |
| 5,616,796 A | 4/1997 | Pocius et al. |
| 5,621,143 A | 4/1997 | Pocius |
| 5,686,544 A | 11/1997 | Pocius |
| 5,833,208 A | 11/1998 | Lee, Jr. |
| 5,872,197 A | 2/1999 | Deviny |
| 5,910,551 A | 6/1999 | Bowen |
| 5,935,711 A | 8/1999 | Pocius et al. |

FOREIGN PATENT DOCUMENTS

| | | |
|---|---|---|
| EP | 0 220 555 | 5/1987 |
| EP | 0 561 352 | 9/1993 |
| WO | WO 97/07171 | 2/1997 |
| WO | WO 97/17383 | 5/1997 |
| WO | WO 98/12296 | 3/1998 |
| WO | WO 98/17694 | 4/1998 |
| WO | WO 99/64475 | 12/1999 |
| WO | WO 99/64528 | 12/1999 |

OTHER PUBLICATIONS

Chemical Abstact, vol. 83, No. 14, Oct. 6, 1975, Columbus, Ohio, Abstract No. 121574 entitled "Recent developments in the study of heterocyclic amine extraction chemistry", XP002141191.

Nöth H. et al., "$^{11}$B– und $^{14}$N–Kernresonanzstudien an tetrakoordinierten Bor–Stickstoff–Verbindungen," *Chem. Ber.*, 107, pp. 3070–3088 (1974).

Fujisawa, Imai, and Mashuhara (*Reports of the Institute for Medical and Dental Engineering*, vol. 3, p. 64 (1969).

* cited by examiner

*Primary Examiner*—William Cheung
(74) *Attorney, Agent, or Firm*—Daniel R. Pastirik; Scott A. Bardell

(57) ABSTRACT

Initiator systems of the invention comprise a complexed initiator comprising a complex of an amidine complexing agent and an initiator; and a decomplexer. The initiator systems are useful for initiating polymerization of at least one monomer to form polymerized compositions. Kits of the invention useful for forming the polymerized compositions comprise a polymerizable composition and an initiator component, wherein the initiator component comprises a complexed amidine initiator. Bonding compositions can be prepared by mixing the polymerizable composition of the kit with the respective initiator component.

5 Claims, No Drawings

INITIATOR/AMIDINE COMPLEXES, SYSTEMS COMPRISING THE COMPLEXES, AND POLYMERIZED COMPOSITIONS MADE THEREWITH

CROSS REFERENCE TO RELATED APPLICATIONS

This application is a divisional of U.S. application Ser. No. 09/433,236, filed Nov. 4, 1999, now U.S. Pat. No. 6,410,667, the disclosure of which is incorporated herein by reference.

FIELD OF THE INVENTION

The present invention relates generally to complexes of initiators and amidines. The complexes are useful in initiator systems for polymerization of monomers.

BACKGROUND OF THE INVENTION

Systems for initiating the polymerization of monomers to make compositions, such as adhesives, are known in the art. U.S. Pat. Nos. 5,106,928, 5,286,821, and 5,310,835 to Skoultchi et al., for example, describe two-part initiator systems for initiating the polymerization of acrylic monomers. The first part of these two-part systems typically includes a stable organoborane amine complex and the second part includes an activator. The activator liberates the organoborane compound by removing the amine group, thereby allowing the organoborane compound to initiate the polymerization process. Activators are also sometimes referred to as liberators or decomplexers.

Common complexes in such systems include complexes of an organoborane and an amine. While such complexes may be useful in many applications, certain problems may arise due to the use of amine complexing agents in such conventional complexes. For example, when the complexes contain a primary amine, adhesives prepared therefrom may be prone to discoloration, such as yellowing. Furthermore, when including reactive diluents, such as aziridine-functional materials described in PCT Publication No. WO 98/17,694, for example, in compositions containing the complexes, the diluents may prematurely react with protic amines (i.e., those amines in which a nitrogen atom is bonded to at least one hydrogen atom) in such complexes, prematurely decomplexing the organoborane initiator. This phenomenon may even be to such an extent as to prematurely initiate polymerization of monomers present with the complexes or to degrade efficacy of the initiators for polymerization of subsequently added monomers.

In light of these potential problems and the desire to provide alternative formulations, further complexes are desirable, particularly for use in initiator systems, such as those used for polymerization of adhesives useful for bonding low surface energy substrates.

SUMMARY OF THE INVENTION

Initiator systems of the invention comprise a complexed initiator comprising a complex of an amidine complexing agent and an initiator; and a decomplexer. Preferably, the initiator comprises an organometallic initiator, such as an organoborane initiator.

Complexes of organoborane initiators and complexing agents of the invention may be represented by the following general Formula (I):

wherein $R^1$ is an alkyl group having 1 to about 10 carbon atoms. $R^2$ and $R^3$ may be the same or different and are selected from (i.e., they are independently selected from) alkyl groups having 1 to about 10 carbon atoms and phenyl-containing groups. "Cx" represents a complexing agent of the invention. The value of "v" is selected so as to provide an effective ratio of amidine nitrogen atoms to boron atoms in the complex.

The initiator systems are useful for initiating polymerization of at least one monomer. To initiate polymerization in such a manner, at least one monomer is provided and then blended with the initiator system. Polymerization of the at least one monomer can be initiated as such.

The amidine complexing agents of the invention may be vinyligous or non-vinyligous. Furthermore, the amidine complexing agents may be protic or non-protic In one preferred embodiment, the amidine complexing agent comprises an amidine represented by Formula (II):

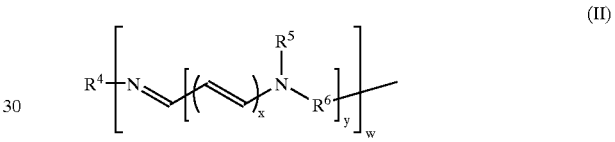

wherein:
  $R^4$ is hydrogen or an organic group, preferably hydrogen or an alkyl or alkylene group;
  $R^5$ and $R^6$ are independently a monovalent organic group or part of a cyclic structure; and
  w, x, and y comprise integers, preferably w being 1 and x being about 3 or less.

Particularly preferred amidine complexing agents comprise those selected from the group consisting of N,N,N', N'-tetramethylguanidine; 1,8-diazabicyclo[5.4.0]undec-7-ene; 1,5-diazabicyclo[4.3.0]non-5-ene; 2-methylimidazole; 2-methylimidazoline; and 4-(N,N-dimethylamino)-pyridine.

According to another aspect of the invention, the amidine complexing agents are used as part of a kit. In one embodiment, kits of the invention comprise
  a polymerizable composition, wherein the polymerizable composition comprises:
    at least one polymerizable monomer, and
    at least one decomplexer; and
  an initiator component, wherein the initiator component comprises:
    a complexed amidine initiator, and
    an optional diluent.

A bonding composition can be prepared by mixing the polymerizable composition of the kit with the respective initiator component. The bonding composition can be used, for example, to prepare substrates at least partially coated with the bonding composition and bonded articles comprising a first substrate and a second substrate, with the polymerized bonding composition adhesively bonding the first and second substrates together. The bonding compositions are particularly useful for coating low surface energy substrates.

DETAILED DESCRIPTION OF THE PREFERRED EMBODIMENTS

This invention provides initiator systems capable of initiating polymerization. More specifically, the invention provides "initiator systems" comprising (1) a complexed initiator (for example, an organoborane amidine complex) and (2) a decomplexer.

In one aspect of the invention, the initiator system is part of a multi-part kit. Such kits comprise at least a first part (i.e., a polymerizable composition) and a second part (i.e., an initiator component) for initiating polymerization of the polymerizable composition. Most preferably, for ease of use, the kits comprise only two parts. The two parts of the kit may be readily combined in a convenient, commercially useful, whole number mix ratio of 1:10 or less, more preferably 1:4, 1:3, 1:2 or 1:1, such that they can be easily used with multi-part dispensers. Such dispensers are shown in U.S. Pat. Nos. 4,538,920 and 5,082,147 and are available from ConProTec, Inc. (Salem, N.H.) under the trade designation, MIXPAC. The parts of the kit can be readily mixed to form bonding compositions, which readily polymerize to polymers, for example, adhesives.

The "polymerizable composition" typically comprises at least one decomplexer and at least one polymerizable monomer.

The "initiator component" typically comprises at least one complexed initiator (e.g., an organoborane amidine complex) and an optional diluent. When mixed with the polymerizable composition, the decomplexer in the polymerizable composition liberates the initiator (e.g., organoborane) from the complexing agent (e.g., amidine), enabling polymerization of the monomer(s) to be initiated.

"Bonding compositions" are those compositions resulting from mixing of the polymerizable composition and the initiator component according to one aspect of the invention. The bonding compositions are useful for bonding a wide variety of substrates, including substrates derived from polymers, wood, ceramics, concrete, and metals. The bonding compositions are especially useful for bonding low-surface energy substrates.

"Low surface energy substrates" are those that have a surface energy of less than 45 mJ/m², more typically less than 40 mJ/m² or less than 35 mJ/m². Included among such materials are, for example, polyethylene and polypropylene.

Other polymers of higher surface energy that may also be usefully bonded with the compositions of the invention include polycarbonate and polymethylmethacrylate. However, the invention is not so limited; the compositions may be used to bond any suitable substrate, such as those derived from thermoplastics, as well as wood, ceramics, concrete, primed metals, and the like.

"Polymerized compositions" (also referred to as polymers) are those compositions where substantially all of the monomers in the bonding composition are polymerized except for a typically unpolymerized amount as recognizable to one of ordinary skill in the art. Polymerized compositions according to the invention may be used in a wide variety of ways, including, for example, as adhesives, bonding materials, sealants, coatings, and injection molding resins. The polymerized compositions may also be used as matrix resins in conjunction with glass, carbon, and metal fiber mats, such as those used in resin transfer molding operations. The polymerized compositions may further be used as encapsulants and potting compounds, such as in the manufacture of electrical components, printed circuit boards, and the like. Those of ordinary skill in the art will recognize a wide variety of other applications in which the polymerized compositions are useful.

Initiator Component

Complexed Initiator

In general, complexed initiators of the invention are complexes of an initiator and a complexing agent, specifically an amidine. A "complex" is readily understood by one of ordinary skill in the art to be a tightly coordinated salt formed by association of a Lewis acid (e.g., initiator) and a Lewis base (e.g., amidine).

Any suitable amidine, or combinations thereof, may be used for the complexing agent, as long as the complexing agent (i.e., the amidine) is reactive with the decomplexer (if any) with which it is to be used. Furthermore, the complexing agent should also be capable of forming a complex with the initiator with which it is used.

Any suitable initiator, or combinations thereof, may be used in the invention, as long as the initiator is capable of forming a complex with the amidine complexing agent. Furthermore, the initiator should also be capable of initiating polymerization of monomers with which it is to be used. Preferably, the initiator is an organometallic initiator.

According to one aspect of the invention, the initiator is as an organoborane. Complexes of organoborane initiators and amidines of the invention may be represented by the following general Formula (I):

wherein $R^1$ is an alkyl group having 1 to about 10 carbon atoms. $R^2$ and $R^3$ may be the same or different and are selected from (i.e., they are independently selected from) alkyl groups having 1 to about 10 carbon atoms and phenyl-containing groups. Preferably, $R^1$, $R^2$ and $R^3$ are independently selected from alkyl groups having 1 to about 5 carbon atoms. Accordingly, $R^1$, $R^2$ and $R^3$ may all be different, or more than one of $R^1$, $R^2$ and $R^3$ may be the same. Most preferably, $R^1$, $R^2$ and $R^3$ are the same. Together, $R^1$, $R^2$ and $R^3$, along with the boron atom (B) to which they are attached, form the initiator. Specific organoborane initiators include, for example, trimethylborane, triethylborane, tri-n-propylborane, triisopropylborane, tri-n-butylborane, triisobutylborane, and tri-sec-butylborane.

The value of v is selected so as to provide an effective ratio of amidine nitrogen atoms to boron atoms in the complex. The ratio of amidine nitrogen atoms to boron atoms in the complex should broadly be about 0.5:1 to about 4:1, preferably about 1:1 to about 2:1, more preferably about 1:1 to about 1.5:1, and most preferably about 1:1.

Complexing Agent

The following terms will hereinafter be used to more particularly describe the complexing agent of the invention:

The terms "monovalent organic group" and "multivalent organic group" mean an organic moiety wherein the available valencies are on carbon atoms. Monovalent organic groups have one available valency. Accordingly, multivalent organic groups have more than one available valency.

The "organic groups" can be aliphatic groups or cyclic groups. In the context of the present invention, the term "aliphatic group" means a saturated or unsaturated, linear or branched, hydrocarbon group. This term is used to encompass alkylene, alkenylene, alkynylene, alkyl, alkenyl, and alkynyl groups, for example. The term "alkyl group" means a monovalent, saturated, linear or branched, hydrocarbon group (e.g., a methyl, ethyl, isopropyl, t-butyl, heptyl, dodecyl, octadecyl, amyl, or 2-ethylhexyl group, and the like). The term "alkylene" means a multivalent, saturated, linear or branched hydrocarbon group. The term "alkenyl group" means a monovalent, unsaturated, linear or branched, hydrocarbon group with one or more carbon-carbon double bonds (e.g., a vinyl group). The term "alkenylene" means a multivalent, unsaturated, linear or branched, hydrocarbon group with one or more carbon—carbon double bonds. The term "alkynyl group" means a monovalent, unsaturated, linear or branched, hydrocarbon group with one or more carbon—carbon triple bonds. The term "alkynylene" means a multivalent, linear or branched, hydrocarbon group with one or more carbon-carbon triple bonds.

The term "cyclic group" or "cyclic structure" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" means a mononuclear aromatic hydrocarbon group or polynuclear aromatic hydrocarbon group.

Organic groups or organic linking groups, as used herein, can include internal (i.e., not terminal) heteroatoms (e.g., O, N, or S atoms), such as in the case of heterocyclic groups, as well as internal functional groups (e.g., carbonyl groups).

Cx in Formula (I) represents an amidine complexing agent. "Amidines" are compounds having at least one N=C—N unit in its structure.

Amidines of the invention may also be vinyligous. "Vinyligous amidines" are those compounds having at least one N=C—(C=C)$_n$—N unit in its structure, wherein "n" represents an integer greater than zero.

Amidines provide strong coupling to organometallic initiators, such as organoboranes, with the resulting complexes having excellent oxidative stability. Thus, the use of amidines as complexing agents, particularly in initiator systems of the invention, is particularly beneficial.

Advantageously, the preferred initiator/amidine complexes of the invention are air stable. By "air stable" it is meant that, when the complexes are stored in a capped vessel at room temperature (about 20° to about 22° C.) and under otherwise ambient conditions (i.e., not under a vacuum and not in an inert atmosphere), the complexes remain useful as polymerization initiators for at least about two weeks. Preferably, the complexes may be readily stored under these conditions for many months and up to a year or more.

Air stability of the complex is enhanced when the complex is a crystalline material (i.e., the complex is a solid at room temperature, but has a measurable melting point when measured according to Differential Scanning Calorimetry). However, complexes of the invention are air stable for at least six months even when they are liquids at room temperature. In some embodiments, liquid complexes (i.e., those complexes having a measurable melting point that is lower than room temperature when measured according to Differential Scanning Calorimetry) or solutions of solid or liquid complexes may be preferred because liquids are generally easier to handle and mix at room temperature than are solids. One of ordinary skill in the art is capable of readily determining whether a complex based on selected initiators and amidine complexing agents is a liquid or solid at room temperature.

Particularly preferred "air stable" complexes are non-pyrophoric. That is, the complexes do not spontaneously combust or self-ignite. One of ordinary skill in the art is capable of readily determining whether a complex based on selected initiators and amidine complexing agents is non-pyrophoric. For example, the Pyrophoricity Test described in the Examples, infra, is one method of determining whether a complex is pyrophoric.

Preferably, Cx is represented by the following Formula (II):

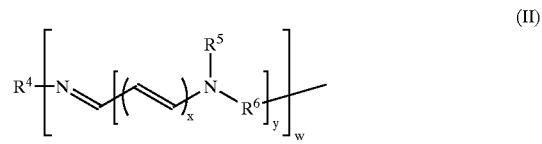

Preferably, $R^4$ is hydrogen or an organic group. When $R^4$ is hydrogen, the amidine is protic. When $R^4$ is an organic group, the amidine is non-protic. More preferably, $R^4$ is hydrogen or an alkyl, alkylene, alkenylene, arylene, or aryl group. Most preferably, $R^4$ is hydrogen or an alkyl or alkylene group. $R^5$ and $R^6$ are independently a monovalent organic group or part of a cyclic structure (the term "cyclic structure" as used herein also includes bicyclic structures). When any of $R^4$, $R^5$, and $R^6$ is an organic group, preferably the organic group includes 18 or fewer total atoms, more preferably 8 or fewer total atoms, and most preferably 4 or fewer total atoms.

Together, $R^4$, $R^5$, and $R^6$ may form a cyclic structure (e.g., ring) connecting to any suitable location on the amidine. For example, $R^4$ and $R^5$ may be included in a cyclic structure or $R^4$, $R^5$, and $R^6$ may be included in a bicyclic structure.

As used in Formula (II), "w" can be any suitable integer greater than zero. Typically, the starting materials used to prepare the amidine complexing agent dictate the value of w. Typically and preferably, w is 1 to about 3, most preferably 1.

The value of "x" can also be any suitable integer greater than or equal to zero. When, x is an integer greater than zero, the amidine is termed a vinyligous amidine. Typically and preferably, x is about 3 or less.

The value of "y" can be any suitable integer greater than zero. For example, y can be 1 or 2.

Certain amidine complexes are known in the art. For example, see certain of the chemical structures disclosed in Nöth H. et al., "$^{11}$B-und $^{14}$N-Kernresonanzstudien an tetra-koordinierten Bor-Stickstoff-Verbindungen," Chem. Ber., 107, pp. 3070–88 (1974). However, the use of such complexes in initiator systems of the invention has not been reported. Furthermore, the complexing agents reported for use in the disclosed amidine complexes are all cyclic structures.

Exemplary complexing agents useful in the preparation of complexes of the invention include those prepared from the following amidines: N,N,N',N'-tetramethylguanidine; 1,8-diazabicyclo[5.4.0]undec-7-ene; 1,5-diazabicyclo[4.3.0]non-5-ene; 2-methylimidazole; and 2-methylimidazoline. A particularly exemplary vinyligous amidine is 4-(N,N-dimethylamino)-pyridine. Exemplary organoboranes useful in the preparation of complexes of the invention include: triethylborane and tributylborane. It should also be noted that blends of different complexes may be used in initiator systems of the invention.

Initiator/amidine complexes may be readily prepared using known techniques. Typically, the amidine is combined with the initiator in an inert atmosphere with slow stirring. An exotherm is often observed and cooling of the mixture is therefore recommended. If the ingredients have a high vapor pressure, it is desirable to keep the reaction temperature below about 70° C. to 80° C. Once the materials have been well mixed, the complex is permitted to cool to room temperature (i.e., about 22° C. to about 25° C.). No special storage conditions are required although it is preferred that the complex be kept in a capped vessel in a cool, dark location. Advantageously, the complexes can be prepared in the absence of organic solvents that would later have to be removed, although they could be prepared in solvent if so desired.

The initiator/amidine complex is employed in an effective amount, which is an amount large enough to permit polymerization to readily occur to obtain a polymer (preferably, an acrylic polymer). According to one aspect of the invention, when the initiator comprises an organoborane, an effective amount of the organoborane amidine complex is an amount that provides about 0.01 weight % boron to about 1.5 weight % boron, more preferably about 0.01 weight % boron to about 0.60 weight % boron, most preferably about 0.02 weight % boron to about 0.50 weight % boron, based on the total weight of the bonding composition, less the weight of fillers, non-reactive diluents, and other non-reactive components. If the amount of organoborane amidine complex is too low, resulting polymerization may be incomplete or, in the case of adhesives, the resulting composition may have poor adhesion.

On the other hand, if the amount of organoborane amidine complex is too high, then polymerization may proceed too rapidly to allow for effective mixing and use of the resulting composition. Large amounts of the complex could also lead to the generation of large volumes of borane, which in the case of an adhesive, may weaken the bondline when used for bonding substrate(s). The useful rate of polymerization will depend in part on the method of applying the composition to a substrate. Thus, a faster rate of polymerization may be accommodated by using a high-speed, automated industrial adhesive applicator rather than by applying the composition with a hand applicator or by manually mixing the composition.

Diluent

The initiator component may also contain any suitable diluent, or combination thereof The diluent may be reactive or nonreactive with monomers used in the polymerizable composition. Nonreactive diluents include plasticizers well known to those of ordinary skill in the art. Reactive diluents include, for example, aziridine-functional materials and maleate-functional materials. For example, such reactive diluents are described in PCT Publication No. WO 98/17, 694 and U.S. application Ser. No. 09/272,152, entitled "Organoborane Amine Complex Initiator Systems and Polymerizable Compositions Made Therewith, assigned to the assignee of the present invention with Attorney Docket No. 54677USA7A.

An "aziridine-functional material" refers to an organic compound having at least one aziridine ring or group,

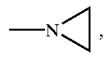

the carbon atom(s) of which may optionally be substituted by short chain alkyl groups (e.g., groups having 1 to about 10 carbon atoms, preferably methyl, ethyl or propyl), so as to form, for example, methyl, ethyl or propyl aziridine moieties.

Examples of useful, commercially available polyaziridines include those available under the following trade designations: CROSSLINKER CX-100 (from Zeneca Resins; Wilmington, Mass.), XAMA-2 (from EIT, Inc.; Lake Wylie, S.C.); XAMA-7 (from EIT, Inc.; Lake Wylie, S.C.), and MAPO (tris [1-(2-methyl) aziridinyl] phosphine oxide (from Aceto Chemical Corporation; Flushing, N.Y.).

Quite advantageously, when used, the initiator/amidine complex is carried by (e.g., dissolved in or diluted by) the diluent or a blend of two or more different diluents in the initiator component. Generally, the diluent should not be reactive toward the complex and functions as an extender for the complex. Also advantageously, the diluent may generally increase the spontaneous combustion temperature of the initiator component, increasing the non-pyrophoric characteristics of the initiator component.

The diluent should be generally soluble in monomers included in the polymerizable composition, such that the parts of the kit can be readily mixed. By "soluble" is meant that no evidence of gross phase separation at room temperature (i.e., about 22° C. to about 25° C.) is visible to the unaided eye. Similarly, the initiator/amidine complex should also be soluble in the diluent, although slightly warming a mixture of the complex and the diluent may be helpful in forming a solution of the two at room temperature (i.e., about 22° C. to about 25° C.). Accordingly, preferably, if used, the diluent is a liquid at or near room temperature (i.e., within about 10° C. of room temperature) or forms a liquid solution with the initiator/amidine complex at or near room temperature.

The diluent is used in an effective amount. Generally, this is an amount of not more than about 50 weight %, preferably not more than about 25 weight %, more preferably not more than about 10 weight %, based on the total weight of the bonding composition. However, substantial amounts (e.g., more than about 15 weight %, sometimes more than about 40 weight %) of the complex may be dissolved in the diluent, which facilitates the provision of multi-part kits that can be combined in a commercially useful mix ratio.

Polymerizable Composition

Decomplexer

The term "decomplexer" means a compound capable of liberating the initiator (e.g., organoborane) from its complexing agent (e.g., amidine), thereby enabling initiation of the polymerization process. Decomplexers are also sometimes referred to as "activators" or "liberators." As used herein, each of these terms has the same meaning.

Any suitable decomplexer, or combinations thereof, can be used, such as isocyanates, acids, acid chlorides, sulfonyl chlorides, anhydrides, compounds capable of liberating any of the foregoing when combined with the initiator component, and mixtures thereof. Depending on the chemistry of the complexing agent, certain decomplexers may be more suitable than others. For example, when the complexing agent is protic, preferred decomplexers include: isocyanates, acids, acid chlorides, sulfonyl chlorides, anhydrides, compounds capable of liberating any of the foregoing when combined with the initiator component, and mixtures thereof As another example, when the complexing agent is non-protic, preferred decomplexers include: acids, compounds capable of liberating acids when combined with the initiator component (e.g., acid chlorides, sulfonyl chlorides, and anhydrides), and mixtures thereof.

Examples of suitable acids include Lewis acids and Brönsted acids. Particularly suitable decomplexers include lower molecular weight carboxylic acid decomplexers described by Skoultchi et al. (U.S. Pat. Nos. 5,310,835 and 5,106,928), sulfonyl chlorides and acid chlorides of Fujisawa, Imai, and Mashuhara (*Reports of the Institute for Medical and Dental Engineering*, vol. 3, p. 64 (1969)), bireactive decomplexers comprising isocyanate groups described by Deviny (PCT Publication No. WO97/07,171), anhydride decomplexers described by Deviny (PCT Publication No. WO97/17,383), carboxylic acid decomplexers described by Deviny et al. (PCT Application No. US98/12, 296, filed Jun. 12, 1998 and entitled "Initiator Systems and Adhesive Compositions Made Therewith"), and mixtures thereof. All of these publications are incorporated herein by reference.

The decomplexer is employed in an effective amount (i.e., an amount effective to promote polymerization by liberating the initiator from its amidine complexing agent, but without materially adversely affecting desired properties of the ultimate polymerized composition). As recognizable to one of ordinary skill in the art, too much of the decomplexer may cause polymerization to proceed too quickly and, in the case of adhesives, the resulting materials may demonstrate inadequate adhesion to low energy surfaces. However, if too little decomplexer is used, the rate of polymerization may be too slow and the resulting polymers may not be of adequate molecular weight for certain applications. A reduced amount of decomplexer may be helpful in slowing the rate of polymerization if it is otherwise too fast. Thus, within these parameters, the decomplexer is typically provided in an amount such that the ratio of amidine-reactive groups in the decomplexer(s) (e.g., acid groups or anhydride groups) to amidine groups is in the range of 0.5:1.0 to 3.0:1.0. For better performance, preferably the ratio of amidine-reactive groups in the decomplexer(s) to amidine groups is in the range of 0.5:1.0 to 1.0:1.0, preferably about 1.0:1.0.

Monomers

The initiator system of the invention can be used to initiate the polymerization of any suitable monomer(s). Broadly, the polymerizable composition includes at least one ethylenically unsaturated monomer capable of free radical polymerization. Numerous compounds containing ethylenic unsaturation can be used in the polymerizable composition. Preferably, the composition includes at least one (meth)acrylic monomer, most preferably a methacrylic monomer. Particularly preferred are (meth)acrylic acid derivatives, such as those including esters and/or acid amides. Suitable are, for example, the (meth)acrylic esters of monohydric alcohols, particularly alkanols having from 1 to 12 carbon atoms, such as methyl (meth)acrylate, ethyl (meth)acrylate, butyl (meth)acrylate, and ethylhexyl (meth)acrylate; the (meth)acrylic acid esters of polyhydric alcohols, such as ethylene glycol, diethylene glycol, polyethylene glycol, and trimethylol propane; the di- and mono (meth)acrylic acid esters of glycerin; the di(meth)acrylic acid esters of triethylene glycol and tetraethylene glycol; the di(meth)acrylic acid esters of dipropylene glycol, tripropylene glycol, tetrapropylene glycol and pentapropylene glycol; and the di(meth)acrylic esters of ethoxylated or propoxylated diphenylolpropane.

Basically suitable are also polymerizable monomers, such as vinyl acetate; vinyl halides, such as vinyl chloride, vinyl fluoride, vinyl bromide; styrene; and divinyl-benzene. These compounds, however, are generally used only in subordinate amounts in the polymerizable compositions.

Further suitable are acid amides, such as: acrylamide; N-methyl acrylamide; N-methyl methacrylamide; N,N-dimethyl acrylamide; N,N-dimethyl methacrylamide; N-ethyl methacrylamide; N,N-diethyl acrylamide; N,N-diethyl methacrylamide; N-isopropyl acrylamide; N-butyl acrylamide; N-butyl methacrylamide; N-t-butyl acrylamide; N,N-dibutyl methacrylamide; N-phenyl acrylamide; N-(acryloyl)morpholine; N-(acryloyl)piperidine; N-(methacryloyl)piperidine; N-(1,1-dimethyl-3-oxobutyl)-acrylamide; N-1,1,3,3-tetramethylbutyl acrylamide; dimethylene-bis-(meth)acrylamide; tetramethylene-bis-(meth)acrylamide; trimethylhexamethylene-bis-(meth) acrylamide; tri(meth)acryloyldiethylenetriamine; and similar compounds.

In general, the emphasis is on monomers with one or two olefinic double bonds in the molecule, preferably one olefinic double bond. The additional use of higher unsaturated components is not excluded, but it must be kept in mind that their presence can lead to embrittling of the polymerized compositions.

Additives

Bonding compositions of the present invention may also comprise further optional additives. Generally, such additives are present in the polymerizable composition of the kit. Thus, the polymerizable composition may further comprise a variety of optional additives.

One particularly useful additive is a thickener, such as medium (about 40,000) molecular weight polybutyl methacrylate that may generally be incorporated in an amount of up to about 50 weight %, based on the total weight of the polymerizable composition. Thickeners may be employed to increase the viscosity of the resulting bonding composition to a more easily applied viscous syrup-like consistency.

Another particularly useful additive is an elastomeric material. These materials can improve the fracture toughness of bonding compositions made therewith, which can be beneficial when, for example, bonding stiff, high yield strength materials (e.g., metal substrates that do not mechanically absorb energy as easily as other materials, such as flexible polymeric substrates). Such additives can generally be incorporated in an amount of up to about 50% by weight, based on the total weight of the polymerizable composition.

Core-shell polymers can also be added to the polymerizable composition to modify spreading and flow properties of the bonding composition. These enhanced properties may be manifested by a reduced tendency for the bonding composition to leave an undesirable "string" upon dispensing from a syringe-type applicator, or sag or slump after having been applied to a vertical surface. Accordingly, use of more than about 20% by weight, based on total weight of the polymerizable composition, of a core-shell polymer additive may be desirable for achieving improved sag-slump resistance. Core-shell polymers can also improve the fracture toughness of bonding compositions made therewith, which can be beneficial when, for example, bonding stiff, high yield strength materials (e.g., metal substrates that do not mechanically absorb energy as easily as other materials, such as flexible polymeric substrates).

Small amounts of inhibitors, such as hydroquinone monomethyl ether may be used in the polymerizable compositions, for example, to prevent or reduce degradation of the monomers during storage. Inhibitors may be added in an amount that does not materially affect the rate of polymerization or the ultimate properties of polymers made therewith. Accordingly, inhibitors are generally useful in amounts of about 100–10,000 ppm based on the total weight of the monomers in the polymerizable composition.

Other possible additives include non-reactive colorants, fillers (e.g., carbon black, hollow glass/ceramic beads, silica, titanium dioxide, solid glass/ceramic spheres, and chalk), and the like. The various optional additives are employed in any amount, but generally amounts that do not significantly adversely affect the polymerization process or the desired properties of polymers made therewith.

Bonding Compositions

The parts of the kits (i.e., the polymerizable composition and the initiator component) are blended as would normally be done when working with such materials. The initiator component is added to the polymerizable composition shortly before it is desired to use the bonding composition.

Once the parts of the kit have been combined to form a bonding composition, the composition should be used quickly, as the useful pot life may be short depending upon the monomers, the amount of the initiator component, the temperature at which the bonding is to be performed, the presence or absence of crosslinking agents, and whether a diluent is used. Preferably, to improve bonding, it is desirable to keep the initial bonding temperature below about 40° C., preferably below 30° C., and most preferably below about 25° C. Accordingly, the bonding process can be carried out at room temperature (i.e., about 22° C. to about 25° C.).

The bonding composition is applied to one or both substrates to be bonded and then the substrates are joined together with pressure to force excess bonding composition out of the bond line. This also has the advantage of displacing bonding composition that has been exposed to air and that may have begun to oxidize. In general, the bonds should be made shortly after the bonding composition has been applied to the substrate(s), preferably within about 10 minutes. The typical bond line thickness is about 0.1 to 0.3 millimeters.

The bonds may cure (i.e., polymerize) to a reasonable green strength, i.e., to permit handling of such bonded articles within about 2–3 hours. Full bond strength will generally be reached in about 24 hours under ambient conditions. However, post-curing with heat may be used, if desired.

In one preferred embodiment, the bonding compositions are coated on a low surface energy substrate. In another preferred embodiment, bonded articles comprise a first substrate and a second substrate (preferably at least one of which is a low surface energy polymeric material) adhesively bonded together by a layer of a bonding composition according to the invention.

The invention will be more fully appreciated with reference to the following nonlimiting examples. These examples are merely for illustrative purposes only and are not meant to be limiting on the scope of the appended claims. All parts, percentages, ratios, etc. in the examples and the rest of the specification are by weight unless indicated otherwise.

EXAMPLES

Various tradenames and abbreviations used in the examples are defined according to the following schedule:

| Abbreviation/Tradename | Description |
|---|---|
| BA | Butyl acrylate, available from Aldrich Chemical Company; Milwaukee, WI |
| BLENDEX 360 | Trade designation for a core-shell toughener available from GE Specialty Chemicals; Parkersburg, WV |
| CROSS-LINKER CX-100 or CX-100 | Trade designation for trimethylolpropane tris(3-(2-methylaziridino)propionate, commercially available from Zeneca Resins; Wilmington, MA |
| DBU | 1,8-diazabicyclo[5.4.0]undec-7-ene, available from Aldrich Chemical Company; Milwaukee, WI |
| DMAP | 4-(N,N-dimethylamino)-pyridine, available from Aldrich Chemical Company; Milwaukee, WI |
| EHMA | 2-ethylhexyl methacrylate, available from Aldrich Chemical Company; Milwaukee, WI |
| HMDA | Hexamethylenediamine, available from Aldrich Chemical Company; Milwaukee, WI |
| HDPE | High-density polyethylene, available from Cadillac Plastic; Minneapolis, MN |
| MAA | Methacrylic acid, available from Aldrich Chemical Company; Milwaukee, WI |
| MIXPAC SYSTEM 50 | Trade designation for a 10:1 volume ratio dual syringe applicator, Kit No. MP-050-10-09, commercially available from ConProTec; Salem, NH |
| MMA | Methyl methacrylate, available from Aldrich Chemical Company; Milwaukee, WI |
| PARAPLEX G40 | Trade designation for a polyester plasticizer commercially available from C. P. Hall; Chicago, IL |
| PARAPLEX G41 | Trade designation for a polyester plasticizer commercially available from C. P. Hall; Chicago, IL |
| poly(MMA-co-EA) | poly(methyl methacrylate-co-ethyl acrylate), commercially available under catalog number 18224-9 from Aldrich Chemical Company; Milwaukee, WI |
| PP | Polypropylene, available from Cadillac Plastic; Minneapolis, MN |
| PTFE | Polytetrafluoroethylene, available from Cadillac Plastic; Minneapolis, MN |
| TEB | Triethylborane, available from Aldrich Chemical Company; Milwaukee, WI |
| TFA | trifluoroacetic acid, available from Aldrich Chemical Company; Milwaukee, WI |
| THFMA | tetrahydrofurfuryl methacrylate, available from Sartomer Company; Exton, PA |
| TMG | N,N,N',N'-tetramethylguanidine, available from Aldrich Chemical Company; Milwaukee, WI |
| Z-LIGHT W-1600 | Trade designation for ceramic microspheres (100–350 micron diameter) available Minnesota Mining and Manufacturing Company; St. Paul, MN |

Overlap Shear Bond Strength Test

Each bonding composition was applied directly onto an untreated 2.5 cm×10 cm×0.3 cm (1 inch×4 inch×0.125 inch)

test panel (0.2 millimeter (8 mil)-diameter glass bead spacers were added to the bonding composition) and a bare second test panel was immediately placed against the bonding composition on the first test panel so that the overlapped area was 1.3 cm×2.5 cm (0.5 inch×1 inch). A clamp was applied to the overlapped area. The test panels were either polytetrafluoroethylene (PTFE), high-density polyethylene (HDPE) or polypropylene (PP), as noted in the particular examples, all panels of which are commercially available from Cadillac Plastic; Minneapolis, Minn. A small amount of bonding composition squeezed out of the overlapped area and was allowed to remain.

The bonds were allowed to cure for at least 48 hours at 22° C. The clamps were then removed, and the overlap bonds were tested in shear (OLS) on a tensile tester at a crosshead speed of 1.27 cm/minute (0.5 inch/minute). The overlap shear values were recorded in pounds and converted into pounds per square inch (psi) and megaPascals (MPa).

Preferably, for adequate bonding performance, the OLS values were at least about 150 psi (1.03 MPa), more preferably at least about 300 psi (4.14 MPa) for the PTFE; at least about 500 psi (3.45 MPa), more preferably at least about 700 psi (4.83 MPa) for the HDPE; and at least about 600 psi (4.14 MPa), more preferably at least about 800 psi (5.52 MPa) for the PP. Also, for diverse utility, it is preferable that a particular adhesive is able to adequately bond at least two different types of low surface energy substrates. Accordingly, more preferably, a particular adhesive is able to adequately bond all of PTFE, HDPE, and PP. Most preferably, a particular adhesive is able to adequately bond PTFE to an OLS value of at least about 300 psi (4.14 MPa), HDPE to an OLS value of at least about 700 psi (4.83 MPa), and PP to an OLS value of at least about 800 psi (5.52 MPa).

Organoborane Complex Preparation

Examples 1–3

Various amidine (including vinyligous amidine) complexes with triethylborane were prepared by combining equimolar quantities of a complexing agent and triethylborane under a nitrogen atmosphere without external temperature control. The quantities of each component and type of complexing agent are noted in Table 1.

TABLE 1

| Ex. | Complexing Agent | Weight Complexing Agent (grams (millimoles)) | Weight Triethylborane (grams (millimoles)) |
| --- | --- | --- | --- |
| 1 | N,N,N',N'-tetramethylguanidine | 1.04 (9) | 0.88 (9) |
| 2 | 1,8-diazabicyclo[5.4.0]undec-7-ene | 1.22 (8) | 0.78 (8) |
| 3 | 4-(N,N-dimethylamino)-pyridine | 1.10 (9) | 0.88 (9) |

Comparative Examples C1–C4

Four mixtures of tertiary amine- or imine-functional compounds with triethylborane were prepared by combining equimolar quantities of tertiary amine or imine and. triethylborane under a nitrogen atmosphere without external temperature control. The quantities of each component and type of complexing agent are noted in Table 2. The tertiary amine- or imine-functional compounds did not effectively complex the triethylborane, thus the compositions are referred to as "mixtures" because they remain in a mixed state.

TABLE 2

| Comp. Ex. | Amine/Imine | Weight Complexing Agent (grams (millimoles)) | Weight Triethylborane (grams (millimoles)) |
| --- | --- | --- | --- |
| C1 | N-benzylidinemethyl-amine | 1.07 (9) | 0.88 (9) |
| C2 | Benzophenone imine | 1.27 (7) | 0.69 (7) |
| C3 | N-methylpiperidine | 0.99 (10) | 0.98 (10) |
| C4 | 1,8-bis(dimethylamino)-naphthalene | 1.28 (6) | 0.59 (6) |

Pyrophoricity Test

The pyrophoricity of each organoborane complex (Example 1–3) or mixture of the complexing agent and organoborane (Comparative Example C1–C4) was tested by applying a 0.05 ml aliquot to a 1"×1" paper towel fragment in air to produce a treated paper towel. If the treated paper towel self-ignited (i.e., spontaneously combusted) within one minute or less, the composition is considered pyrophoric. If the treated paper towel did not self-ignite after ten minutes, the composition is considered non-pyrophoric. Results of whether or not each composition is pyrophoric according to the above-described test are tabulated in Table 3.

TABLE 3

| Ex. | Complexing Agent | Pyrophororic? (Yes or No) |
|---|---|---|
| 1 | N,N,N',N'-tetramethylguanidine (Me$_2$N-C(=NH)-NMe$_2$) | No |
| 2 | 1,8-diazabicyclo-[5.4.0]-undec-7-ene | No |
| 3 | 4-(N,N-dimethylamino)-pyridine (Me$_2$N-pyridine) | No |
| C1 | MeN=C(H)-phenyl | Yes |
| C2 | benzophenone imine (Ph$_2$C=NH) | Yes |
| C3 | N-methylpiperidine | Yes |
| C4 | 1,8-bis(dimethylamino)naphthalene (NMe$_2$, NMe$_2$) | Yes |

The Pyrophoricity Test demonstrated the non-pyrophoric characteristics of organoborane complexes of Example 1–3 of the invention. Further, the test demonstrated that Comparative Examples C1–C4 exhibit spontaneous combustion (i.e., pyrophoricity), also indicating that the tertiary amine- or imine-functional compounds used in Comparative Examples C1–C4 did not effectively complex the organoborane. Thus, the comparative compositions remained in mixture form.

$^1$H-NMR Spectroscopy (Proton Nuclear Magnetic Resonance Spectroscopy)

$^1$H-NMR chemical shifts in CDCl$_3$ of methylene groups adjacent to boron in select triethylborane complexes further demonstrated the strong coupling of organoborane complexes useful in the invention. $^1$H-NMR shifts for methylene groups adjacent to boron in organoborane complexes useful in the invention appear below about δ0.5. Methylene groups adjacent to boron in poorly coupled, pyrophoric mixtures of triethylborane and tertiary amine have $^1$H-NMR chemical shifts above about δ1.0. For comparison, $^1$H-NMR shifts for methylene groups adjacent to boron is about δ0.05 in TEB-HMDA (a non-pyrophoric, air-stable triethylborane–primary amine complex described in U.S. Pat. No. 5,621,143) and is about δ1.2 for triethylborane itself.

TABLE 4

| Ex. | Complexing Agent | $^1$H-NMR Shift of B—CH$_2$ |
|---|---|---|
| 1 | N,N,N',N'-tetramethylguanidine | 0.15 |
| 3 | 4-(N,N-dimethylamino)-pyridine | 0.35 |
| 2 | 1,8-dizabicyclo-[5.4.0]-undec-7-ene | 0.35 |
| C3 | N-methylpiperidine | 1.2 |

Bonding Composition Preparation

Example 4

Initiator Component

The triethylborane complex (TEB-TMG) of Example 1 (1.10 grams) was dissolved in 1.55 grams CROSSLINKER CX-100. Air bubbles in the composition were allowed to rise and escape.

Polymerizable Composition

A polymerizable composition was prepared by combining 39.00 grams methyl methacrylate (MMA), 28.00 grams butyl acrylate (BA), 4.80 grams methacrylic acid (MAA), and 30.00 grams poly(MMA-co-EA). Air bubbles were removed from the composition using brief stirring under vacuum.

Bonding Composition

The polymerizable composition and initiator component were packaged in a MIXPAC SYSTEM 50 applicator, the larger cylinder of the applicator holding the polymerizable composition and the smaller cylinder holding the initiator component. The two parts were combined by simultaneous extrusion through a 10 centimeter (4 inch) long, 17-stage static mix nozzle, Part No. MX 4-0-17-5, commercially available from ConProTec; Salem, N.H. Test specimens were prepared and tested according to the Overlap Shear Bond Strength Test, except that steel wire spacers (0.2 millimeter (8 mil) diameter) were inserted into the wet adhesive between the first and second untreated test panels before clamping. Results of testing according to the Overlap Shear Bond Strength Test are tabulated in Table 5.

TABLE 5

| Test Panel | Overlap Shear MPa (psi) |
|---|---|
| HDPE | 3.67 (532) |
| PP | 3.50 (508) |
| PTFE | 1.55 (225) |

Example 5

Initiator Component

A triethylborane complex prepared as in Example 3 (TEB-DMAP) in the amount of 5.00 grams was dissolved in 15.00 grams PARAPLEX G40 plasticizer.

Air bubbles in the composition were allowed to rise and escape.

Polymerizable Composition

A slurry containing 140.00 grams BLENDEX 360, 393.80 grams tetrahydrofurfuryl methacrylate (THFMA), and 131.30 grams 2-ethylhexyl methacrylate (EHMA) was allowed to stand at 70° C. for three hours. The resultant dispersion was allowed to cool and then sheared aggressively with a saw-toothed blade of a laboratory dispersator, commercially available from Premier Mill Corporation; Reading, Pa. 35.00 grams Z-LIGHT W-1600 ceramic microspheres were added to the warm dispersion and mixed well. This material is hereafter referred to as "Monomer Blend A."

A 49.35 gram portion of Monomer Blend A was combined with 0.65 gram trifluoroacetic acid (TFA). Air bubbles were removed from the composition by briefly stirring the composition under vacuum.

Bonding Composition

The polymerizable composition and initiator component were packaged and mixed as in Example 4. Test specimens were prepared and tested according to the Overlap Shear Bond Strength Test. Overlap shear of the composition on a HDPE test panel was 5.39 MPa (782 psi) with a cohesive failure mode.

Comparative Example C5

Example 5 was repeated, except that a weaker acid, methacrylic acid, was used in place of trifluoroacetic acid. A polymerizable composition was prepared from Monomer Blend A (49.02 grams) and 0.98 gram methacrylic acid (MAA). Air bubbles were removed from the composition by briefly stirring the composition under vacuum.

The polymerizable composition was packaged opposite the initiator component of Example 5 and evaluated as in Example 5. Overlap shear of the composition on a HDPE test panel was 0.08 MPa (12 psi) with an adhesive failure mode.

Examples 6–7

Initiator Components

A triethylborane complex prepared as in Example 3 (TEB-DMAP) was dissolved in PARAPLEX G41 polyester plasticizer or in a combination of PARAPLEX G40 plasticizer and 1-butanol, available from Aldrich Chemical Company; Milwaukee, Wis. in the amounts indicated in Table 7. Air bubbles were allowed to rise and escape from the composition.

TABLE 7

| Ex. | Weight TEB-DMAP (grams) | Weight PARAPLEX G41 (grams) | Weight PARAPLEX G40 (grams) | Weight 1-butanol (grams) |
|---|---|---|---|---|
| 6 | 1.25 | 3.75 | none | none |
| 7 | 1.25 | None | 3.33 | 0.42 |

Polymerizable Compositions

Monomer Blend A was combined with trichloroacetic acid or its anhydride, both commercially available from Aldrich Chemical Company; Milwaukee, Wis., in the amounts indicated in Table 8. Air bubbles were removed from the composition by briefly stirring the composition under vacuum.

TABLE 8

| Ex. | Weight Monomer Blend A (grams) | Weight Trichloroacetic Acid (grams) | Weight Trichloroacetic Anhydride (grams) |
|---|---|---|---|
| 6 | 49.07 | 0.93 | none |
| 7 | 48.24 | None | 1.76 |

Bonding Compositions

The polymerizable compositions and initiator components were combined and evaluated for overlap shear strength on a HDPE test panel as in Example 5. The results are tabulated in Table 9.

TABLE 9

| Example | Overlap Shear MPa (psi) |
|---|---|
| 6 | 4.85 (704) |
| 7 | 5.28 (766) |

Various modifications and alterations of this invention will become apparent to those skilled in the art without departing from the scope and spirit of the invention. It should be understood that this invention is not limited to the illustrative embodiments set forth herein.

What is claimed is:

1. A kit comprising:
   a polymerizable composition, wherein the polymerizable composition comprises:
      at least one polymerizable monomer, and
      at least one decomplexer; and
   an initiator component, wherein the initiator component comprises:
      a complexed amidine initiator, and
      an optional diluent.

2. A bonding composition comprising the polymerizable composition of the kit of claim 1 mixed with the respective initiator component of the kit of claim 1.

3. A substrate at least partially coated with the bonding composition of claim 2.

4. The substrate of claim 3, wherein the substrate comprises a low surface energy substrate.

5. A bonded article comprising:
   a first substrate,
   a second substrate, and
   a polymerized bonding composition of claim 2 that adhesively bonds the first and second substrates together.

* * * * *